379-184 EX

E4819 OR RE 15,706

Party may re-signal Examiner called party who has answered and hung up.

Oct. 30, 1923. Re. 15,706

T. G. MARTIN

TWO-WIRE PARTY LINE LOCKOUT TELEPHONE SYSTEM

Original Filed Jan. 3, 1911 3 Sheets-Sheet 1

Inventor
Talbot G. Martin
Chas. Th. Lundy Atty.

7

Examiner

Oct. 30, 1923. Re. 15,706

T. G. MARTIN

TWO-WIRE PARTY LINE LOCKOUT TELEPHONE SYSTEM

Original Filed Jan. 3, 1911 3 Sheets-Sheet 2

Inventor
Talbot G. Martin
Chas. Th. Cundy Atty.

Oct. 30, 1923. Re. 15,706
T. G. MARTIN
TWO-WIRE PARTY LINE LOCKOUT TELEPHONE SYSTEM
Original Filed Jan. 3, 1911 3 Sheets-Sheet 3
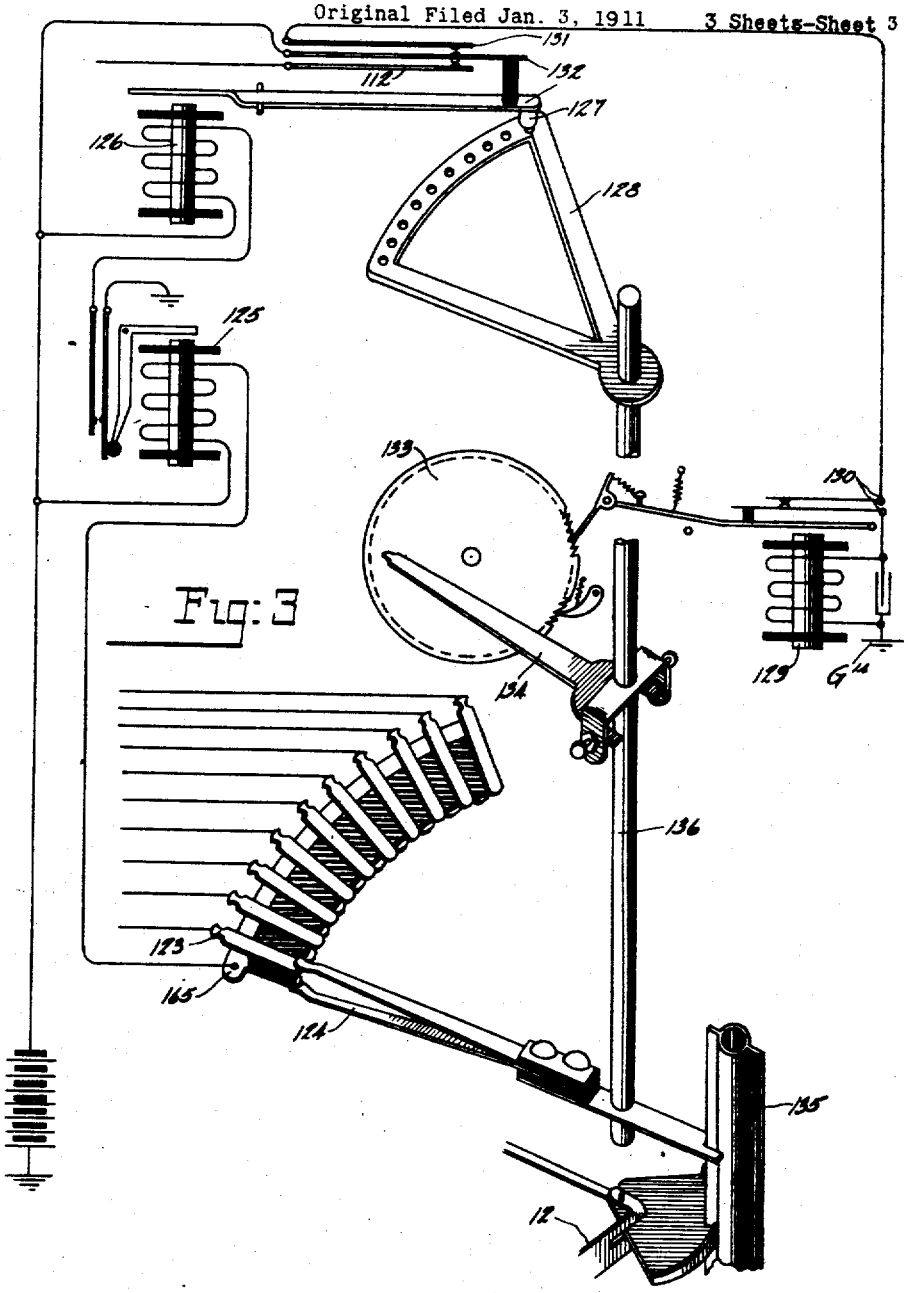
Inventor
Talbot G. Martin
Chas. W. Cauley Atty.

79. TELEPHONY.

17

Reissued Oct. 30, 1923. Re. 15,706

UNITED STATES PATENT OFFICE.

TALBOT G. MARTIN, OF CHICAGO, ILLINOIS, ASSIGNOR TO AUTOMATIC ELECTRIC COMPANY, OF CHICAGO, ILLINOIS, A CORPORATION OF ILLINOIS.

TWO-WIRE PARTY-LINE LOCKOUT TELEPHONE SYSTEM.

Original application filed January 3, 1911, Serial No. 600,610. Renewed April 29, 1918, Serial No. 231,539. Patent No. 1,291,587. Divided and application filed December 7, 1918, Serial No. 265,813. Original No. 1,324,202, dated December 9, 1919. Application for reissue filed December 7, 1921. Serial No. 520,699.

*To all whom it may concern:*

Be it known that I, TALBOT G. MARTIN, a citizen of the United States of America, and resident of Chicago, Cook County, Illinois, have invented a certain new and useful Improvement in Two-Wire Party-Line Lockout Telephone Systems, of which the following is a specification.

My invention relates to telephone systems in general, and is illustrated in connection with a party line such as is shown in my prior application Serial No. 231,539, filed April 29, 1918, renewal of Serial No. 600,610 issued as Patent No. 1,291,587, Jan. 14, 1919, of which this application is a division.

The object of this invention is to provide means whereby, if a call is set up to a called subscriber who answers the call but hangs up before conversation is completed, the calling subscriber may again signal or re-ring the called subscriber without having to hang up and extend the call again.

It is also an object to provide certain details and features of improvement and combinations tending to increase the efficiency and serviceability of a telephone exchange system of this particular character.

To the foregoing and other useful ends my invention consists in matters hereinafter set forth and claimed.

Figure 1:
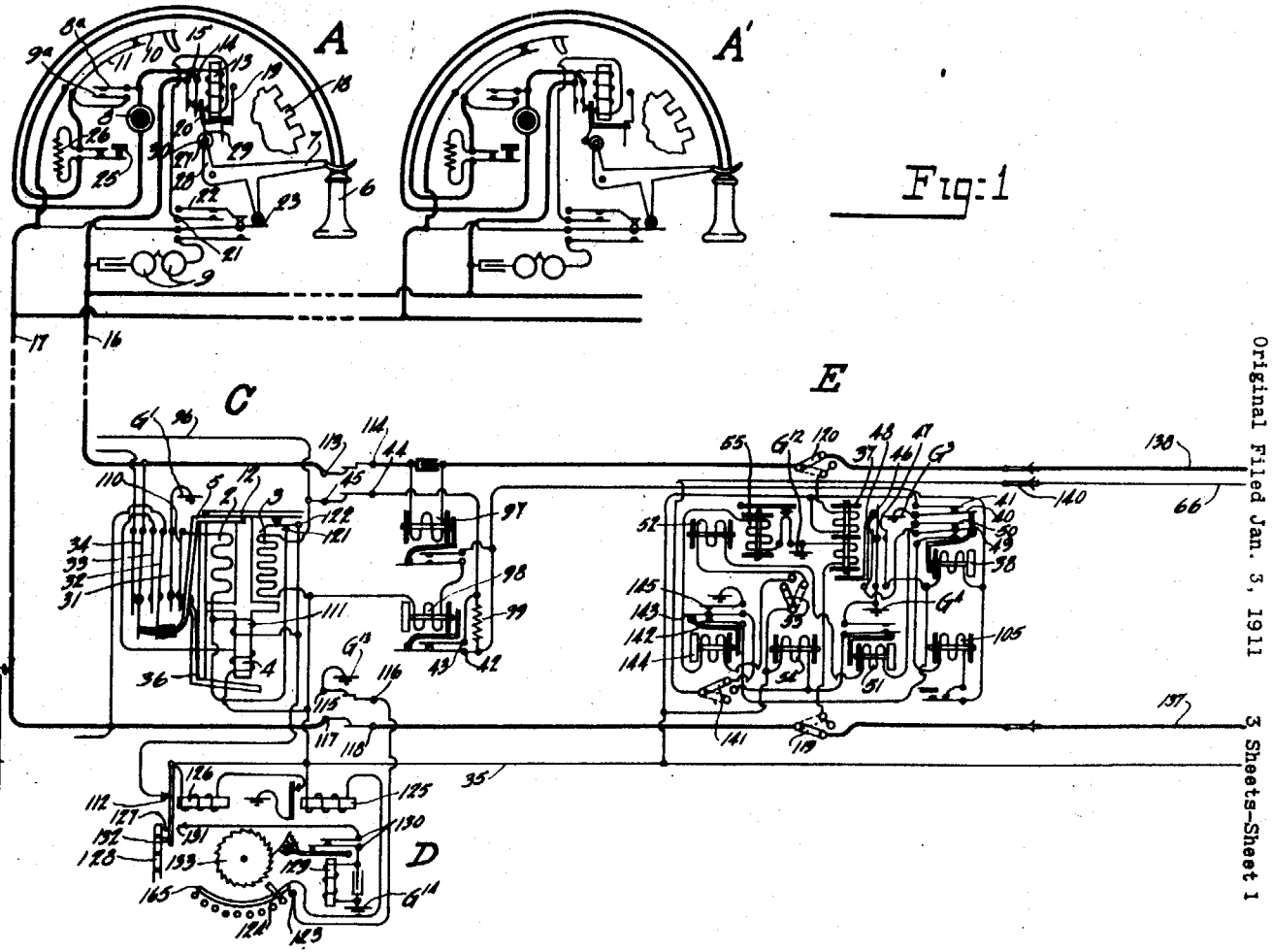
Figure 2:
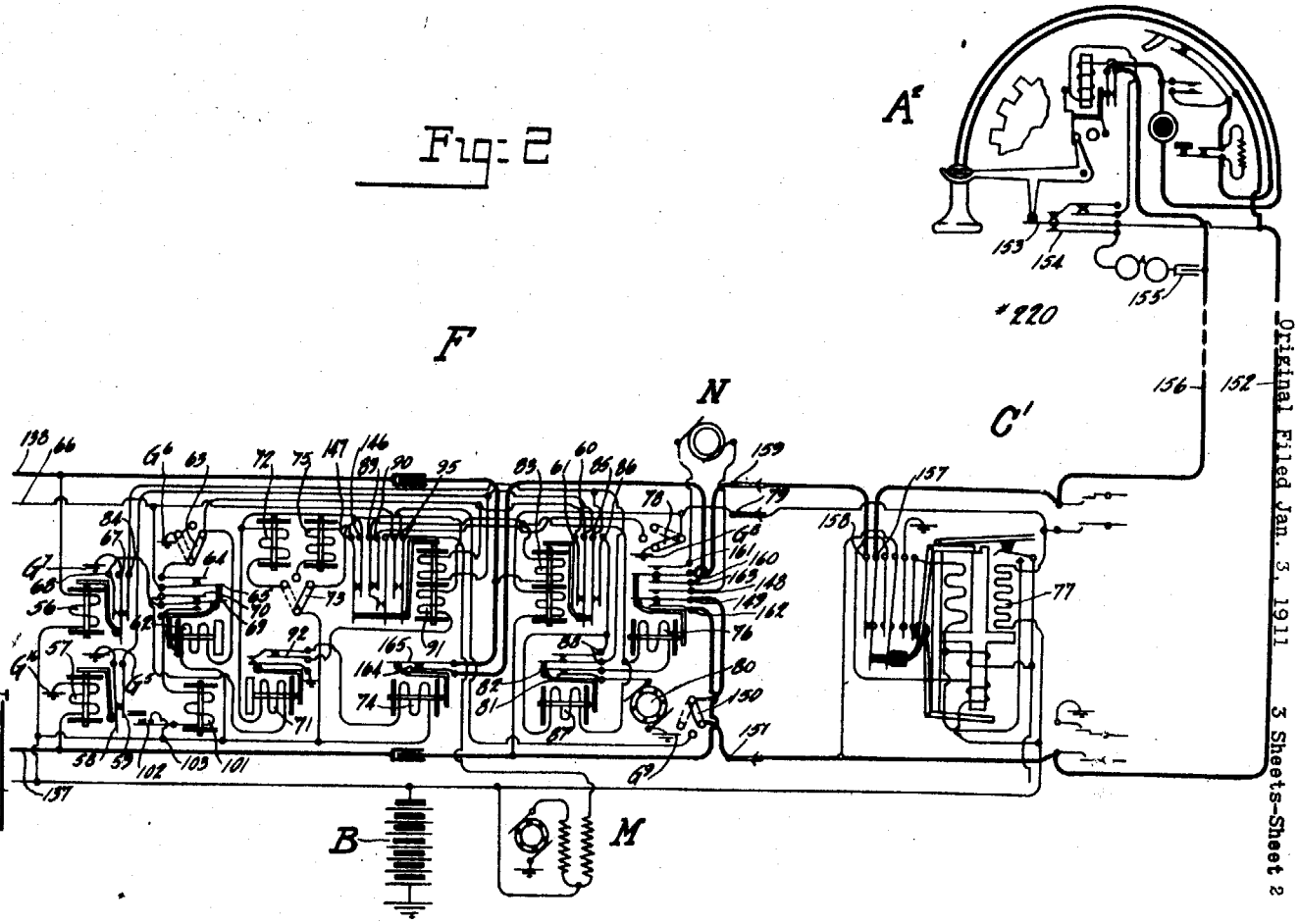

In the accompanying drawings Figures 1 and 2 taken together show a complete circuit connection between a calling substation A (Fig. 1) and a called substation $A^2$ (Fig. 2) in a system embodying the principles of my invention.

Fig. 3 is a diagrammatic representation of the essential features of the so-called master switch D (Fig. 1).

In Fig. 1 there is shown a party-line to which the two telephones A and A′ are connected. This line is connected with the individual or line switch C at the central office. A number of individual switches C are controlled by a common master switch D and have common access to a group of trunk lines each of which leads to a selector similar to selector E. The selector E, together with a number of other similar switches, has common access to a number of groups of trunk lines leading to connector switches F (Fig. 2), which in turn have direct access to the calling terminals of the subscribers' lines.

The line switches C and C′ and master switch D are of the general type disclosed in British Patent No. 26,301 of 1906, and in the American Telephone Journal of New York, N. Y., of June 6, 1908, having a somewhat modified construction. Referring to the line switch C, the operating winding 2, cut-off winding 3, line winding 4, and auxiliary winding 111, are placed upon a single core forming a plural wound electromagnet having two distinct magnetic circuits, so that the windings upon one end have no effect upon the armatures upon the other end. Of the windings upon the upper end of the magnet the winding 2 is strong enough to operate both the plunger arm 12 and cut-off armature 3, while the winding 3, though strong enough to operate the armature 5 and to hold the plunger arm 12 in its operated position, is not strong enough to attract said plunger arm from its normal position.

The selector E is of the general type disclosed in United States Letters Patent No. 815,321, issued March 13, 1906, to Keith, Erickson and Erickson, being modified somewhat, however, in order to operate in a two-wire system, i. e., a system in which the central office apparatus is controlled by impulses transmitted from the calling substation over the two sides of the line in series. The release magnet 105 is preferably arranged to release the switch mechanism immediately upon energizing in the manner shown in United States Letters Patent No. 815,176 for connector switches, rather than upon deenergizing as shown in said selector Patent No. 815,321. The relays 144, 51 and 38 deenergize slowly when their energizing circuits are broken.

The connector F is of the general type disclosed in United States Letters Patent No. 815,176, issued March 13, 1906, to Keith, Erickson and Erickson, but, like the selector, is modified to operate in a two-wire system.

The substations may be of any suitable common battery two-wire automatic type. The ones with which I have elected to illustrate my invention comprise the usual receiver 6 (see substation A, Fig. 1), switch hook 7, transmitter 8 and ringer 9. For the purpose of producing impulses for controlling the central office apparatus, this substation is also provided with a pair of impulse springs 10 and 11, impulse wheel 18 and a dial (not shown). A pair of springs $8^a$ and $9^a$ are provided for closing a shunt circuit about the transmitter and receiver. In the preferred form of my invention I provide each substation with a relay which is adapted, when in an operated position, to close the contact between the springs 14 and 15, thereby bridging the talking circuit across the line conductors. The relay is also provided with a spring 19 which, when the relay is energized, catches and locks the armature 20 in its operated position until the receiver hook is pulled down. Since the relay, when energized is locked up mechanically it cannot be affected by any change in the circuit conditions of the telephone, such as the opening of the line for the purpose of transmitting impulses to the central office. One terminal of the winding of the relay 13 is connected to the conductor 16, while the other terminal is connected to the hook switch spring 21 which normally engages the spring 22. As the switch hook rises when the receiver is removed, the spring 23 which is connected to the line conductor 17 engages the spring 22 and forces it out of engagement with the spring 21. Thus, for an instant during the upward movement of the switch hook all these springs 21, 22 and 23 are in contact, thereby momentarily bridging the relay 13 across the line. The relay 13 is so wound and adjusted that when it is thus bridged across the line it receives sufficient current from the central office to be operatively energized. If, however, the talking circuit of some other telephone is in bridge of the line at the time the circuit of the relay 13 is closed, sufficient current is shunted away from the relay by said talking circuit to prevent the relay from being operated. It will be understood that the relay 13 may have any suitable resistance, so as to secure its proper operation. Since the bridging of the talking circuit at a telephone across the line is dependent upon the operation of the relay 13 at that telephone, it will be seen that it will be impossible for a second subscriber to come in on the line while some other subscriber is using it. In case one subscriber wishes to call another subscriber on the same line, the first subscriber can, by pressing the button 25 and removing the short-circuit from the resistance 26, increase the resistance of his talking circuit sufficiently at the time the second subscriber removes his receiver to permit the relay 13 at the second substation to be energized and place the second telephone in talking condition.

In order to notify a calling subscriber whether or not the line is busy when he attempts to make a call, I provide an opening in the wall of the telephone. Upon the end of the arm 28 of the receiver hook there is placed a small target or signal, which may have the word "Busy" written on it. When the receiver hook rises this target comes behind the opening 27 and may be seen by the subscriber. To the armature 20 there is attached an arm 29 carrying a shield 30 which, when the relay is energized, comes behind the opening 27, but in front of the target on the switch hook arm 28, thereby hiding said target from the calling subscriber.

The operations by which one subscriber calls another in the system shown herein are as follows: It will be assumed, first, that the subscriber at substation A calls subscriber $A^2$, No. 220. When the subscriber at substation A removes his receiver a momentary circuit is closed from ground G′ through the springs 31 and 32, line 17, springs 23, 22 and 21, relay 13, line 16, springs 34 and 33 and winding 4 to the battery lead 35, thence to battery B and to ground. The relay 13 is energized by this impulse and locks up, bridging the talking circuit across the line. The winding 4 of the switch C, upon energizing, attracts the armature 36, which closes the circuit of the winding 2. This circuit extends from ground G′ through the springs 31 and 110, windings 2 and 111, contact point 112 and armature 132 to the battery lead 35. The winding 2, upon energizing, attracts the plunger arm 12 and cut-off armature 5. The plunger arm 12, upon being attracted, operates to force the line switch plunger into a bank of contact springs 113, 114, 45, 44, 115, 116, 117 and 118, forcing them into contact in pairs as shown in the drawings. The armature 5 upon operating, disconnects the line winding 4 and ground G′ from the calling line, whereupon the armature 36 falls back and opens the circuit of the winding 2. Before the winding 2 is deenergized, however, a circuit is closed through the winding 3 in the following manner: When the springs 113 and 117 are forced into contact with the springs 114 and 118 by the plunger of the line switch C, the line circuit is extended to the first selector switch E, and a circuit is closed from ground $G^{12}$ through the lower winding of the relay 37 at the selector E, side switch wiper 119, springs 118 and 117, line 17, talking circuit of the substation A, line 16, springs 113 and 114, side switch wiper 120 and the upper winding of the relay 37 to battery. The line relay 37 of the selector thereupon energizes and closes the circuit of the slow-acting relay 38. This relay 38, upon energizing, completes a circuit from ground $G^3$ through the springs 40, 41, 42, 43, 44 and 45 and winding 3 of the switch C to battery. The winding 3 holds the switch C in its operated position after the armature 36 has fallen back and broken the circuit of the winding 2. In order to insure against the armature 36 falling back before the winding 3 is energized, the auxiliary winding 111 is energized in series with the pull-down winding 2 and is short-circuited through the springs 121 and 122 when the plunger arm reaches the limit of its downward movement. The winding 111 thus serves to hold up the armature 36 for an instant after the winding 4 is deenergized, so as to give the winding 3 a little longer time in which to energize. When the line switch C operates, the master switch D operates in a well-known manner to advance the plungers of the idle line switches to an idle trunk.

The operation of the master switch D is as follows: The closure of contact between the springs 115 and 116 of the line switch C completes a circuit from ground $G^{13}$ through the springs 115 and 116, contact point 123 (which is assumed to correspond to the trunk seized by the switch C), wiper 124, segment 165 and relay 125 to battery. The relay 125, upon energizing, closes a circuit through the relay 126. The relay 126, upon energizing, withdraws the pin 127 from an opening in the locking plate 128 and closes a circuit through the motor magnet 129. This circuit extends from ground $G^{14}$ through the magnet 129, interrupter springs 130, contact point 131 and armature 132 to battery. The magnet 129 operates in a manner similar to that of a buzzer as long as the armature 132 engages the contact point 131, and, through the medium of the ratchet wheel 133 and link 134 (Fig. 3), rotates the plunger shaft 135 about the shaft 136 to move the plungers of the idle line switches to an idle trunk line. As soon as the wiper 124, which moves with the plunger shaft, passes off the contact 123, the relay 125 deenergizes and breaks the circuit of the relay 126. The master switch continues to operate, however, until the next opening in the plate 128 passes directly under the pin 127, whereupon the armature 132 falls back and breaks the circuit of the magnet 129. The openings in the plate are so spaced that the armature 132 can fall back only when the plungers of the line switches are directly in front of a trunk line. If busy trunk lines have to be passed before the plungers can arrive at an idle trunk, the relays 125 and 126 are maintained energized by ground potentials on the master switch bank contacts of said busy trunks until the idle trunk is reached.

The calling subscriber now operates his calling device for the first digit 2 of the number desired, whereby the impulse springs 10 and 11 which are included in the bridge at the substation are separated twice momentarily, each time opening the line or inserting a high resistance therein and thereby causing the line relay 37 of the selector E to be deenergized. In order to eliminate the resistance of the transmitter and receiver from the line circuit, the short-circuit through the springs $8^a$ and $9^a$ is closed at this time. This short-circuit can be closed in any desired manner, but is preferably placed under the control of the calling device, so that when the calling device is operated, the springs $8^a$ and $9^a$ are brought into contact to close this short-circuit. The relay 37, upon deenergizing, closes a circuit from ground $G^4$ through the springs 46, 48, 49 and 50 (the slow-acting relay 38 does not fall during the momentary interruption of its circuit), relay 51, vertical magnet 52 and side switch wiper 53 to battery. The vertical magnet operates to raise the switch shaft two steps, while the slow-acting relay 51 operates to close the circuit of the private magnet 54. The relay 51 does not have time to deenergize until after the last impulse for the digit is delivered, when it breaks the circuit of the magnet 54, which deenergizes and allows the side switch to pass to second position. The rotary magnet 55 thereupon operates in a well-known manner to rotate the wipers onto an idle trunk leading to a connector F, after which the side switch of the selector passes to third position, cutting off the line relay of the selector, and extending the line to the line relays 56 and 57 of the connector, whereupon said relays become energized. The energizing circuit for these relays extends from ground $G^{16}$ through the relay 57, trunk conductor 137, thence over the heavy conductors through the selector E, line switch C, substation A and back over the other side of the line through the switches C and E, trunk conductor 138 and relay 56 to battery. The relay 57 of the connector, upon energizing, completes a circuit from ground $G^5$ through the springs 58 and 59, 60 and 61 and relay 62 to battery. The relay 62, upon energizing, extends a connection from ground $G^6$ through the side switch wiper 63 and springs 64 and 65 to the conductor 66, for the purpose of providing a guarding potential for the selector private bank contacts of the seized trunk, and for maintaining a holding circuit for the relay 38 of the selector E. This holding circuit extends from ground $G^6$ through the side switch wiper 63, springs 64 and 65, conductor 66, private bank contact and wiper 140, side switch wiper 141, springs 143 and 142 and relay 38 to battery. The relay 144 of the selector E is energized in series with the rotary magnet, and, being slow acting, remains in its operated position for an instant after the side switch passes to third position, and through the medium of the springs 145 and 143 provides a guarding potential for the selector private bank contacts during the short interval before the relays 57 and 62 of the connector operate. Of course, the relay 114 deenergizes more quickly than does the relay 38 so as to close the above-described holding circuit before the latter relay drops back.

When the calling subscriber operates his calling device for the second digit 2, the line is again opened twice, each time breaking the circuit of the relays 56 and 57 at the connector. The slow relay 62 does not have time to fall back during the momentary interruption of its circuit by the relay 57; consequently, each time the relay 56 deenergizes, a circuit is closed from ground $G^7$ through the springs 67, 68, 69 and 70, relay 71, vertical magnet 72 and side switch wiper 73 to battery. The magnet 72 operates to raise the shaft and wipers two steps, while the slow-acting relay 71 acts in the same manner as explained for the relay 51 of the selector E to cause the private magnet 74 to trip the side switch to second position. In passing from first to second position, the side switch wiper 73 transfers the battery connection from the vertical magnet to the rotary magnet 75. When the calling device is operated for the last digit 0 the rotary magnet receives ten impulses and rotates the wipers ten steps onto the contacts of the line #220, after which the side switch is tripped to third position by the private magnet in the same manner in which it was tripped to second position after the completion of the impulses for the first digit. The operating circuit of the rotary magnet 75 extends from ground $G^7$ through the springs 67 and 68, 69 and 70, relay 71, springs 146 and 147, magnet 75 and side switch wiper 73 to battery. When the side switch reaches third position the connection between the calling and the called lines is completed, the called line is provided with a guarding potential at the connector private bank contacts, the line winding of the line switch C′ is cut off and a circuit is closed through the ringing relay 76. The switch C′ is cut off by the winding 77, which is energized over a circuit extending from ground $G^8$ through the side switch wiper 78, private wiper 79 and winding 77 to battery. The energizing circuit of the relay 76 extends from ground $G^9$ through the interrupter 80, springs 81 and 82, relay 76 and side switch wiper 73 to battery. The relay 76 is energized intermittently to ring the called subscriber. The ringing circuit extends from one terminal of the ringing current generator N through the springs 148 and 149, side switch wiper 150, shaft wiper 151, line 152, substation springs 153 and 154, ringer and condenser 155, line 156, springs 157 and 158, wiper 159 and springs 160 and 161 to the other terminal of the generator. When the receiver at the called substation is removed, that substation is provided with talking current through the back-bridge relay 83 of the connector. This circuit over which the talking current is supplied extends from ground $G^8$ through the side switch wiper 78, lower winding of the relay 83, ringing relay springs 162 and 149, side switch wiper 150, line wiper 151, thence over the heavy conductors to and through the substation $A^2$ and back over the other side of the line, and through the ringing relay springs 160 and 163, springs 164 and 165, upper winding of the relay 83 and side switch wiper 73 to battery. The relay 83, upon energizing, closes a circuit from ground $G^7$ through the springs 67 and 84 of the relay 56, springs 85 and 86, relay 87 and side switch wiper 73 to battery. The relay 87, upon energizing, breaks the operating circuit of the relay 76 and closes a locking circuit for itself through the springs 88.

The two connected subscribers may now carry on an uninterrupted conversation, and no other subscriber on either line can break in on the connection. Referring to Fig. 1 suppose the receiver at substation A′ is removed. As the hook goes up a circuit will be closed through the relay 13 at that station but said relay will be shunted by the talking circuit at the substation A and will not be operated, thereby leaving the talking circuit open as shown in Fig. 1.

In case the called line had been busy when the connector F sought to make connection therewith, the private wiper 79 would have found its private bank contact grounded and immediately upon engaging said contact would have extended a ground potential through the side switch wiper 78 (in second position), springs 90 and 89 and lower winding of the relay 91 to the spring 92 of the private magnet relay 71 and through the private magnet 74 to battery. As the relay 71 deenergized after the last digit was called, the private magnet would have been maintained energized over the above circuit by the ground at the private wiper, locking the side switch in second position and at the same time the relay 91 would have been energized. This relay, upon energizing, transfers the holding ground for the private magnet from the guarded private bank contact to the ground $G^6$ through the side switch wiper 63 and springs 64 of relay 62. The side switch being locked in second position, no connection would be completed with the busy line, and the busy signaling machine M would be connected with the calling line by the closure of the springs 95 at the relay 91.

179. TELEPHONY.

17

From the foregoing it is evident that the connector cannot make connection with a line which has a ground upon its connector private bank contacts. It will also be seen that as soon as the connection is extended to the selector E a guarding potential is extended from ground $G^3$ through the springs 40, 41, 42, 43, 44 and 45, and over the conductor 96 to the connector private bank contacts of the calling line. In order to permit a subscriber to call back on his own line to signal another subscriber thereon, each trunk line leading to a selector E is provided with the relays 97 and 98, which so modify the guarding potential of the calling line while the calling device at the calling station is being operated as to allow a connector to make connection therewith at that time. It will be seen that all impulses must pass through the relay 97 which, upon deenergizing after connection is extended to the selector E, closes a circuit through the slow-acting relay 98. The relay 98, upon energizing, removes the short-circuit around the resistance 99, thereby inserting this resistance in the ground connection to the private contacts of the calling line. Thus it will be seen that when the calling subscriber is calling back on his own line, at the time the private magnet relay 71 deenergized after the last digit is called, the resistance 99 will be included in the circuit, which tends to lock the private magnet. This resistance is high enough to prevent said magnet from being locked, and the side switch passes to third position in the usual manner. A moment later the relay 98 (Fig. 1) falls back and cuts out the resistance 99 to restore the guarding potential of the calling line to its effective condition.

When a calling subscriber calls back on his own line a circuit will be closed through the back-bridge relay of the connector and the calling substation, which will cause the circuit of the ringer relay 76 to be opened. In order to signal the called substation the calling subscriber must press the button 25, thereby increasing the resistance of the bridge sufficiently to allow the connector line relay 56 to fall back, but not the relay 57. The relay 56, upon falling back, breaks the circuit of the relay 87, which falls back and closes the circuit of the ringer relay. The pressing of the button 25 also increases the resistance of the bridge at substation A sufficiently to allow the relay 13 at the called substation to be energized when the called subscriber answers. The bridging of the called telephone across the line causes the relay 56 to again pull up, which causes the ringing current to be cut off. The calling subscriber then releases his button.

After a connection is completed the switches are released by the hanging up of the receiver at the calling substation. This allows the connector line relays to fall back, which removes the holding ground from the release relays 62 and 38 of the switches F and E, respectively. The relay 62, upon deenergizing, completes the circuit of the release magnet 101, which releases the connector. The circuit of the magnet 101 is broken at the springs 102 and 103 when the switch shaft reaches its lowest position. In like manner the selector E is released by the magnet 105 when the relay 38 falls back. When the relay 38 deenergizes it also breaks the holding circuit of the winding 3 of the switch C, allowing its plunger to be restored.

In the case of a call from the subscriber A for instance to the subscriber, should the subscriber $A^2$ hang up his receiver before the subscriber A had finished his conversation the circuit is so arranged that the calling subscriber may then operate his calling device to again operate the bell at station $A^2$. In this drawing (Fig. 2) it will be noticed that the ring cut-off relay 87, after the called man hangs up and deenergizes relay 83 is locked energized only through the springs 67 and 84 of the line relay 56, instead of being permanently locked. Now when the calling subscriber operates his dial and relay 56, in response to the resultant opening of the line circuit, falls back, this locking circuit of relay 87 is opened at springs 67 and 84 and relay 87 therefore falls back and closes the original circuit of the ringing relay 76 again. Relay 76 operates in the same manner as when the call was first set up to connect the generator N to the called line to signal the subscriber thereon. Relay 83 will again be energized as soon as the called subscriber answers this second call and again energizes relay 87 through springs 85 and 86. It will thus be seen that a subscriber is saved the trouble of hanging up and again setting up the connection to the subscriber $A^2$ in case the subscriber $A^2$ hangs up too soon.

In party-line systems of the kind shown herein, the different parties on a line may be signaled selectively in the following well-known manner: The bells of the different substations may be tuned or otherwise adapted to respond to only a certain kind of ringing current. Each subscriber's line may be accessible by a plurality of groups of connectors, each group representing a different hundreds digit. The numbers of the different substations on the same line may then be given different hundreds digits, corresponding to the respective hundreds groups of connectors. Each group of connectors may be supplied with ringing current of the proper character to operate only the ringers of the substations whose hundreds digits correspond to that connector group. Thus, to signal any particular substation on a line the line must be called through a connector in a group which is supplied with ringing current of the proper character to operate the bells at the desired substation, and the connector group is determined by the hundreds digit of the called substation.

Throughout this specification, where a telephone is spoken of as being in normal position, it is meant that the receiver is on the switch hook. A line is spoken of as being in normal position when the receivers of all telephones on said line are on their switch hooks.

What I claim as my invention is:

1. In a telephone exchange system, a plurality of lines, automatic means for establishing a connection between a calling and a called line, automatic means operative as a result of the establishment of the connection for ringing called lines, a switch for producing interruptions in said calling line, and means responsive to said interruptions for reringing called lines.

2. In a telephone system, a called line, means including a train of automatic subscriber controlled switches for establishing a connection with said line and for automatically applying signalling current thereto, a relay, means controlled by the subscriber on the called line for energizing said relay to stop the automatic signalling operation, a circuit for locking said relay energized independent of the control of the called subscriber, and means for opening said locking circuit to permit said current to be again applied to said line.

3. In a telephone system, incoming lines and outgoing lines, means for establishing a connection between an incoming line and an outgoing line, automatic means started independent of the calling subscriber for signalling over said outgoing line, means for producing long and short circuit interruptions in said incoming line, means operative in response to said short circuit interruptions for causing the repeated operation of said automatic means, and automatic means operative in response to said long circuit interruptions for restoring said first mentioned means.

4. In a telephone system, incoming and outgoing lines, a selector and connector switch for extending an incoming line to an outgoing line, automatic means started independent of the calling subscriber for applying interrupted signalling current to said outgoing line, a relay associated with one end and a variably operable circuit interrupter with the other end of said incoming line, means for causing the repeated operation of said automatic means, and means for restoring said selector and connector, said last two mentioned means being controlled by said relay.

5. In a telephone system, a plurality of lines, means for establishing a connection between a calling and a called line, a full metallic circuit extending from the calling line to said means, automatic means operated as a result of the establishment of the connection for signalling a substation on the called line, an interrupter for producing interruptions in said metallic circuit, and means responsive to said interruptions for causing the repeated operation of said automatic means.

6. In a telephone system, a plurality of lines, means for establishing a connection between a calling and a called one of said lines, a full metallic circuit extending from said calling line to said means, automatic means started independent of the calling subscriber for signalling a substation on the called line, an interrupter for producing interruptions of various duration in said metallic circuit, means responsive to interruptions of a certain duration for causing the repeated operation of said automatic means, and means responsive to interruptions of a different duration for causing the restoration of said first mentioned means.

7. In a telephone system, a plurality of lines, a selector switch for establishing a connection between a calling and called one of said lines, a full metallic circuit extending from the calling line to said selector, an interrupter for producing long and short interruptions in said metallic circuit, automatic means for signalling on the called line, a relay adapted upon operation to disconnect said automatic means, releasing means for said selector, a second relay controlling said releasing means, means responsive to said short interruptions for controlling said first mentioned relay and means responsive to said long interruptions for controlling said second mentioned relay.

8. In a telephone system, a plurality of lines, means for establishing a connection between a calling and a called one of said lines, a full metallic circuit extending between a calling line and said means, automatic means started independent of the calling subscriber for signalling said called line, a switch for producing interruptions of various duration in said metallic circuit, means responsive to interruptions of a certain duration for again initiating the operation of said automatic means after its operation has been stopped, and a releasing device for said first mentioned means responsive to interruptions of a different duration.

9. In a telephone system, a plurality of lines, means for establishing a connection between a calling and a called one of said lines, automatic means operated in response to the establishment of the connection for signalling the called line, a switch for producing interruptions in said calling line,

TELEPHONY.

17 and means operative responsive to said interruptions for causing the resignalling of the called line.

10. In a telephone system, a calling and a called line, means for establishing a connection between said lines and for automatically applying signalling current to said called line, means controlled by the response of the subscriber on the called line for stopping the signalling operation, means for preventing the re-application of signalling current to the called line when the subscriber thereon replaces his receiver, and means controlled from said calling line for rendering said last mentioned means inoperative.

11. In a telephone system, a called line, means including automatic switches for extending a connection to said line, means operated as a result of the establishment of said connection for applying signalling current to said called line, means controlled by the response of the subscriber on the called line for stopping the signalling operation, and means operated independent of the called line for again applying signalling current to said called line.

12. In a telephone system, a called line, means including automatic switches for extending a connection to said line, automatic means operated after the establishment of said connection for applying signalling current to said called line, means controlled by the response of the subscriber on the called line for stopping the signalling operation, and means operative independent of the called line for again applying signalling current to said called line.

13. In a telephone system, a called line, automatic progressively movable switching mechanism for establishing a connection with said line, means actuated after the connection is established for automatically applying signalling current to said called line, means for stopping the signaling operation, and means operated independent of the called line for again applying signalling current to said called line.

14. In a telephone system, a called line, automatic progressively movable switching mechanism for establishing a connection with said line, means actuated after the connection is established for automatically applying signalling current to said called line, means operated independent of the calling line for stopping the signalling operation, and means operative independent of the called line for again actuating said first mentioned means.

15. In a telephone system, a called line, automatic progressively movable switching mechanism for establishing a connection with said line, means actuated after the connection is established for automatically applying signalling current to said called line, a locking relay for stopping the signaling operation, and means operative exclusive of control over said called line for unlocking said relay.

16. In a telephone system, a called line, automatic switches for extending a connection to said line, means in the last of said switches for automatically applying signalling current to the called line, means controlled by the response of the subscriber on the called line for stopping the signalling operation, and means operated exclusive of the control of the subscriber on the said called line for again actuating the first mentioned means.

17. In a telephone system, a called line, means including automatic switches for extending a connection to said line and for automatically applying signalling current thereto, a relay in one of said switches, means controlled by a subscriber on the called line for energizing said relay to stop the signalling operation, a circuit for locking said relay energized independent of control over said called line, and means for opening said locking circuit to permit said signalling current to be again applied to said line.

18. In a telephone system, a calling line, means including automatic switches for extending a connection to said line and for automatically applying signalling current thereto, a relay in one of said switches, means controlled by the subscriber on the called line for energizing said relay to stop the signalling operation, a circuit for locking said relay energized independent of control over said called line, and another relay operative to open said locking circuit to permit said current to be again applied to said line.

Signed at Chicago, Illinois, Cook County, this 5th day of December, 1921.

TALBOT G. MARTIN.